US011215701B2

(12) United States Patent
Behzadi et al.

(10) Patent No.: US 11,215,701 B2
(45) Date of Patent: Jan. 4, 2022

(54) COHERENT LIDAR

(71) Applicant: Aeva, Inc., Mountain View, CA (US)

(72) Inventors: Behsan Behzadi, Sunnyvale, CA (US); Neal N. Oza, Palo Alto, CA (US); Oguzhan Avci, Cupertino, CA (US); Keith Gagne, Santa Clara, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 249 days.

(21) Appl. No.: 16/586,737

(22) Filed: Sep. 27, 2019

(65) Prior Publication Data

US 2021/0096228 A1    Apr. 1, 2021

(51) Int. Cl.
| | | |
|---|---|---|
| *G01C 3/08* | (2006.01) | |
| *G01S 7/4911* | (2020.01) | |
| *G01S 7/481* | (2006.01) | |
| *G01S 7/4913* | (2020.01) | |
| *G01S 7/4912* | (2020.01) | |
| *G01S 13/34* | (2006.01) | |

(52) U.S. Cl.
CPC .......... *G01S 7/4911* (2013.01); *G01S 7/4815* (2013.01); *G01S 7/4913* (2013.01); *G01S 7/4917* (2013.01); *G01S 13/347* (2013.01)

(58) Field of Classification Search
None
See application file for complete search history.

(56) References Cited

U.S. PATENT DOCUMENTS

2003/0076485 A1\* 4/2003 Ruff .................. G01S 7/491
356/5.09
2015/0177367 A1\* 6/2015 Sebastian ............... G01S 17/34
356/5.09

FOREIGN PATENT DOCUMENTS

WO    WO2019/060901 A1 \*  3/2019   ............ G01C 3/08
WO    WO2020/064224 A1 \*  4/2020   ............ G01S 7/4911

\* cited by examiner

*Primary Examiner* — Mark Hellner
(74) *Attorney, Agent, or Firm* — Womble Bond Dickinson (US) LLP

(57) ABSTRACT

A light detection and ranging (LIDAR) system includes optical sources to emit optical beams with synchronized chirp rates and chirp durations. The optical beams provide a comb of coherent optical beams with a fixed frequency separation between frequency adjacent optical beams. A first set of first optical components amplifies and combines the optical beams into a combined optical beam. A second set of optical components transmits the combined optical beam toward a target environment and receives a target return signal. A third set of optical components downconverts the target return signal to downconverted target return signals corresponding to the optical beams, and coherently combines the downconverted target return signals.

18 Claims, 6 Drawing Sheets

COHERENT LIDAR

TECHNICAL FIELD

The present disclosure relates generally to light detection and ranging (LIDAR) systems and methods using multi-laser transmitters to increase range and detection sensitivity.

BACKGROUND

Increasing LIDAR detection range and detection sensitivity has been limited to designing more powerful lasers, but this approach is difficult and costly in applications such as autonomous vehicle navigation systems.

SUMMARY

The present disclosure describes example LIDAR systems and methods for increasing the effective power and sensitivity of a LIDAR transceiver through the use of multiple coherent lasers with constructive interference.

In one example, a LIDAR system includes a number of optical sources to emit a corresponding number of optical beams with synchronized chirp rates and chirp durations, where the optical beams provide a comb of coherent optical beams in the frequency/wavelength domain with a fixed frequency separation between frequency adjacent optical beams.

In one example, the fixed frequency separation between the frequency adjacent optical beams is selected to produce periodic regions of constructive and destructive interference when the optical beams are combined, where the separation between the periodic regions of constructive interference is less than the range resolution of the system.

In one example, a first set of optical components is coupled with the optical sources to amplify and combine the optical beams into a combined optical beam.

In one example, a second set of optical components is coupled to the first set of optical components to transmit the combined optical beam toward a target environment and to receive a target return signal.

In one example, a third set of optical components is coupled to the second set of optical components to downconvert the target return signal to a number of fixed frequency downconverted target return signals corresponding to the number of optical beams, and to coherently combine the downconverted target return signals.

In one example, a fourth set of optical components is coupled to the first set of optical components to sample the optical beams and to generate control signals to synchronize the optical sources.

In one example, a method in a LIDAR system includes, generating, from a number of optical sources, a corresponding number of optical beams with synchronized chirp rates and chirp durations, where the optical beams provide a comb of coherent optical beams with a fixed frequency offset between frequency adjacent optical beams. In one example, the method also includes combining the plurality of optical beams into a combined optical beam, transmitting the combined optical beam toward a target environment, downconverting a target return signal to a number of fixed frequency downconverted target return signals corresponding to the number of optical beams, and coherently combining the downconverted target return signals.

In one example, the fixed frequency separation between the frequency adjacent optical beams is selected to produce periodic regions of constructive and destructive interference in the combined optical beam, wherein a separation between the periodic regions of constructive interference is less than a range resolution capability of the system.

In one example, the method also includes generating control signals from the optical beams to synchronize the optical sources.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Figure 1:
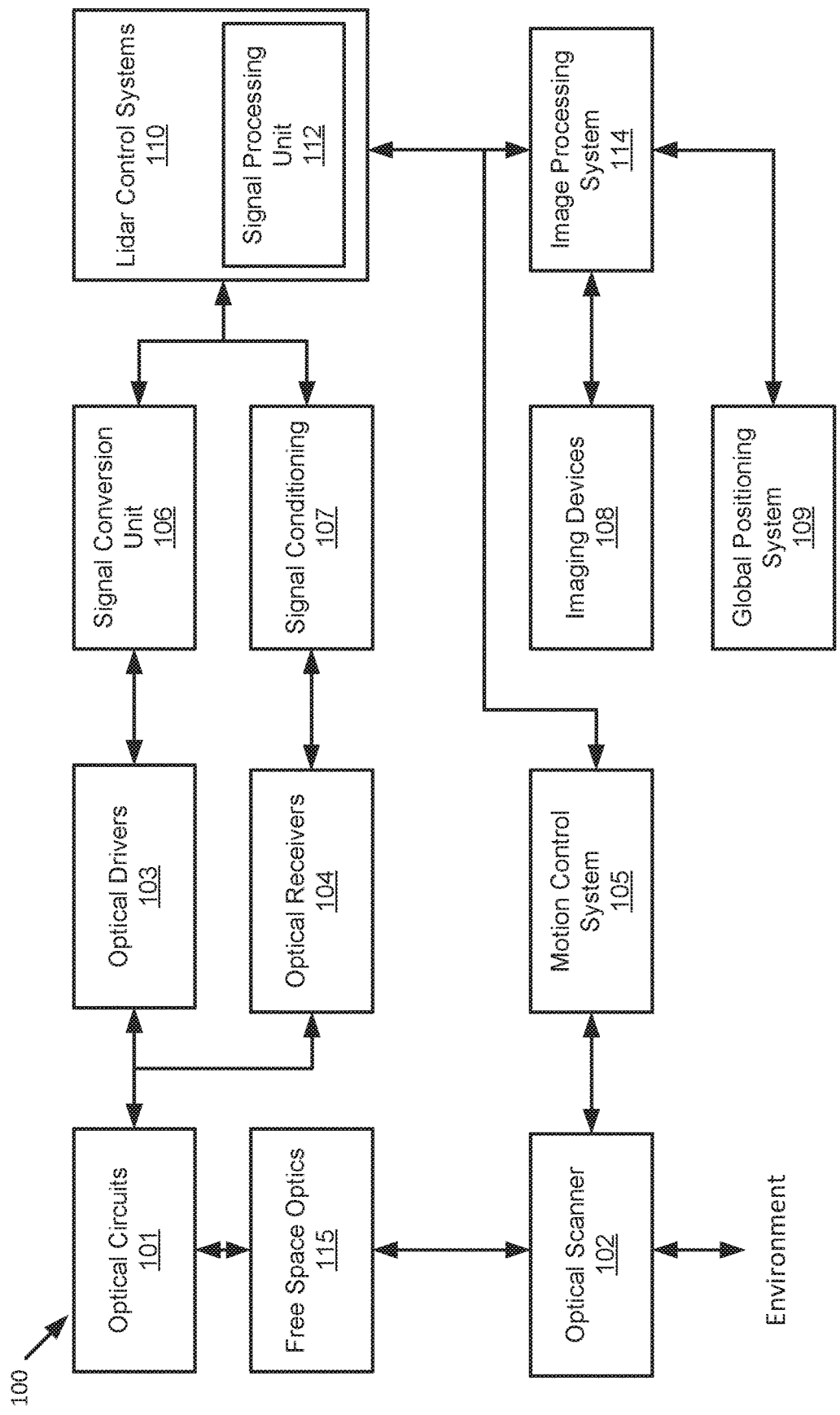
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 that may be implemented on a photonics chip. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like. Passive optical components may transmit, reflect, combine, separate, sample and polarize optical beams, for example. Passive optical components, for example, may include optical waveguides, circulators, wavelength division multiplexers and demultiplexers, polarization wave plates, interferometers, samplers, couplers and the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, circulators, interferometers, mixers, or the like. In some embodiments, the free space optics 115 may include components to transform the polarization state and direct received polarized light to optical detectors using a PBS. The free space optics 115 may further include a diffractive element to deflect optical beams having different frequencies at different angles along an axis (e.g., a fast-axis).

In embodiments, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. In other embodiments, the optical scanner 102 may be realized as an optical phased-array or an array of MEMS (micro electro-mechanical systems) mirrors. The optical scanner 102 also collects light incident upon any objects in the environment into a return optical beam that is returned to the passive optical circuit component of the optical circuits 101. For example, the return optical beam may be directed to an optical detector by a polarization beam splitter or a circulator. In addition to the mirrors and galvanometers, optical phased arrays, and MEMS mirror arrays, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may include a processing device for the LIDAR system 100. In embodiments, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a signal processing unit 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some embodiments, the signals from the optical receivers 104 may be subject to signal conditioning 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment. In some example implementations, the system points multiple modulated optical beams to the same target.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control subsystem. The optical circuits may also include a polarization wave plate to transform the polarization of the light as it leaves the optical circuits 101. In embodiments, the polarization wave plate may be a quarter-wave plate or a half-wave plate. A portion of the polarized light may also be reflected back to the optical circuits 101. For example lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using analog-to-digital converters (ADCs). The digital signals are then sent to the LIDAR control systems 110. A signal processing unit 112 may then receive the digital signals and interpret them. In some embodiments, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data from GPS 109 to provide a precise global location.

Figure 2:
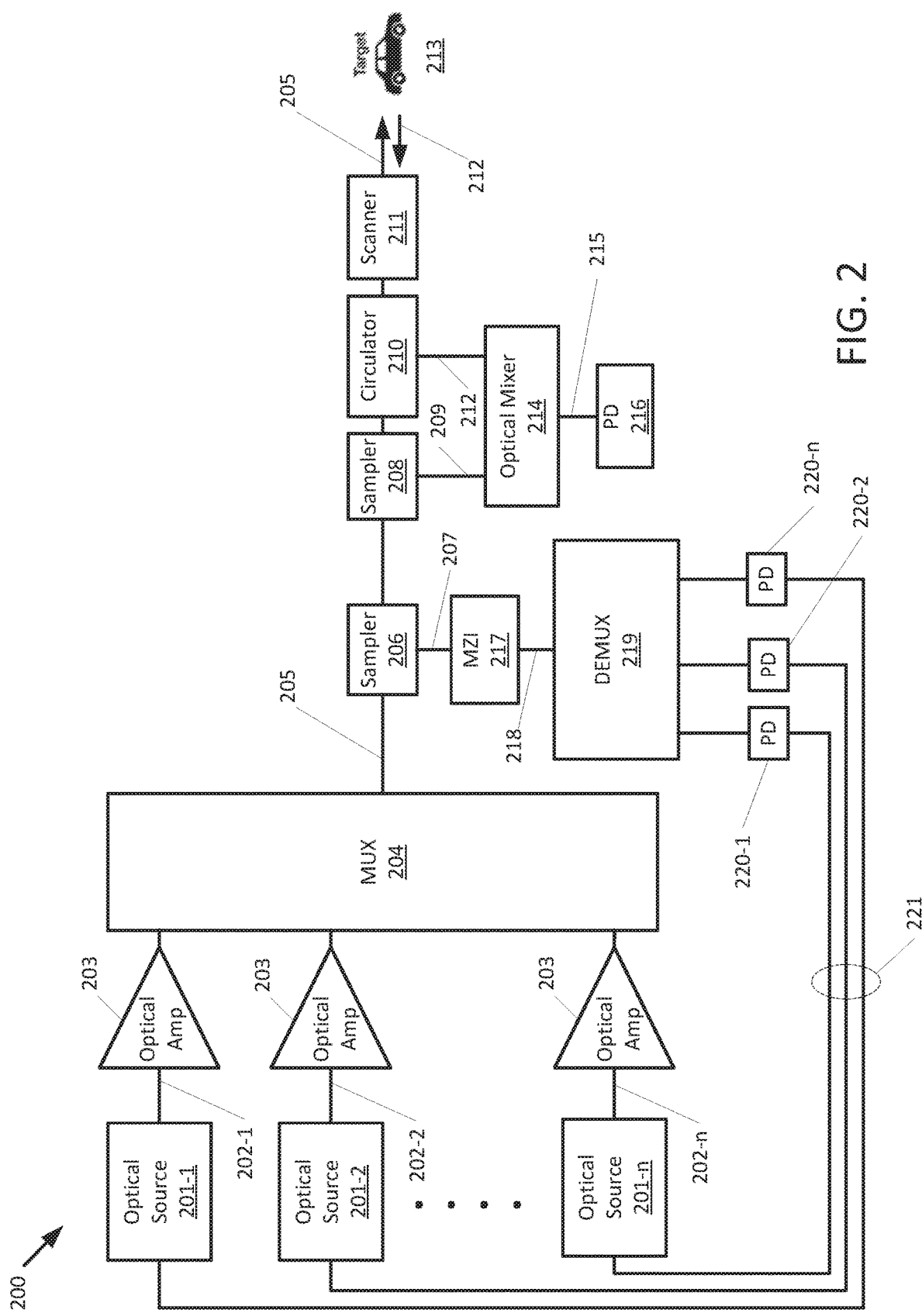
FIG. 2 is a block diagram illustrating an example LIDAR system in a first configuration according to the present disclosure.

FIG. 2 is a block diagram illustrating an example LIDAR system 200. Some of the optical components illustrated in FIG. 2 may be integrated components within a photonics integrated circuit and may be included in the optical circuits 101 illustrated in FIG. 1, for example. Other optical components illustrated in FIG. 2 may be free space optical components and may be included in the free space optics 115 illustrated in FIG. 1.

Figure 3:
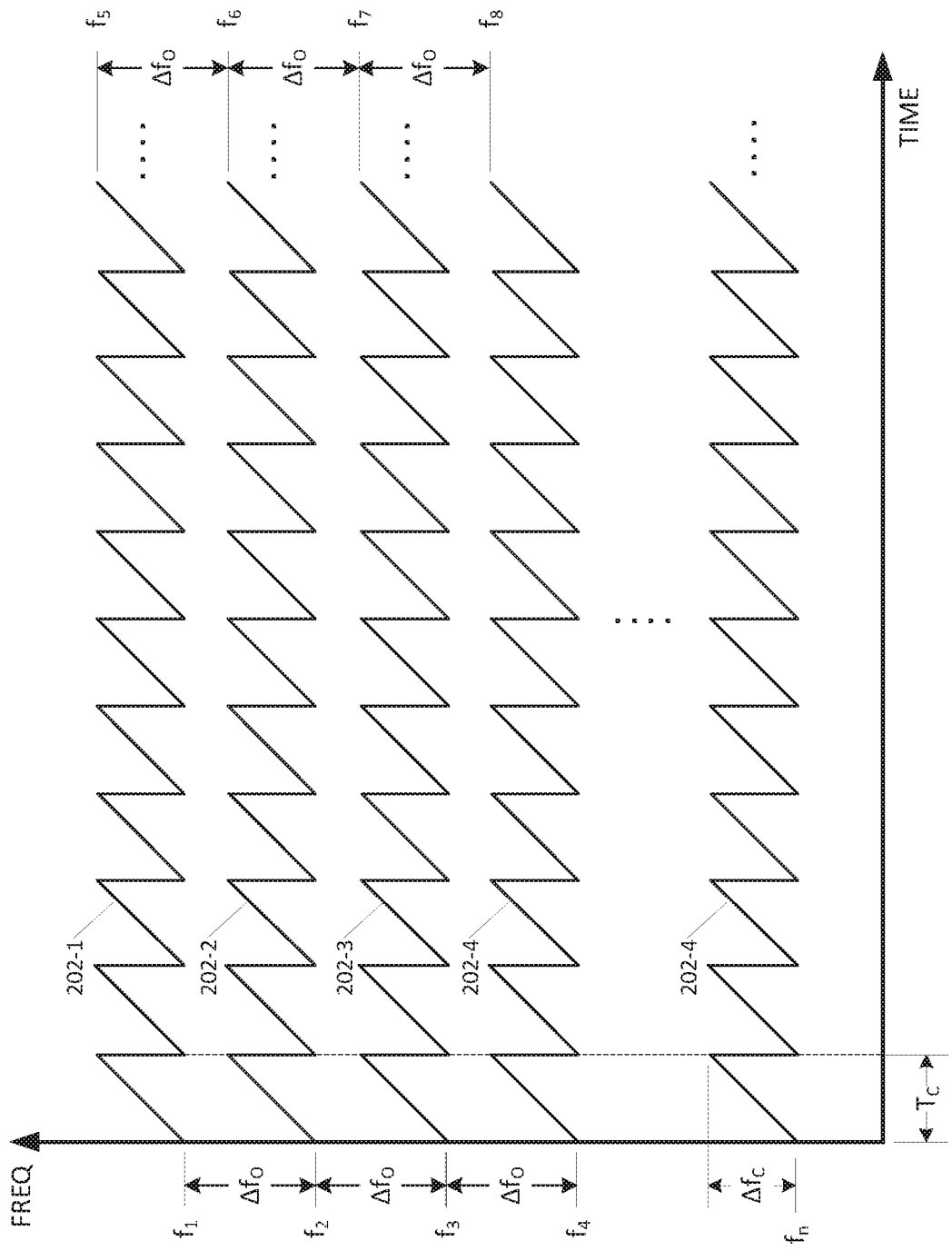
FIG. 3 is a time-frequency diagram illustrating one example of LIDAR waveforms according to the present disclosure.

System 200 includes a plurality of optical sources 201-1 through 201-n that each emit a corresponding coherent optical beam (e.g., laser beam) 202-1 through 202-n. The optical beams (202 collectively) are frequency modulated with synchronized linear "chirp" waveforms, which may be sawtooth waveforms or triangle waveforms, for example. FIG. 3 illustrates an example of sawtooth modulation. As illustrated in FIG. 3, the optical beams 202 are tuned to have a fixed frequency separation or offset $\Delta f_0$ between frequency adjacent beams so that the optical beams 202 form a "comb" of equally spaced signals in the frequency domain. FIG. 3 also illustrates that, because the chirps are synchronized, having the same timing, chirp bandwidth ($\Delta fc$), and chirp period (Tc), the frequency offset between any two adjacent beams is maintained throughout each chirp. This is illustrated in the time-frequency diagram 300 of FIG. 3 for the first four optical beams (202-1, 202-2, 202-3, and 202-4), where the separation $\Delta fo$ between frequencies $f_1$i, $f_2$, $f_3$ and $f_4$ is the same as the separation between frequencies $f_5$, $f_6$, $f_7$ and $f_8$.

Returning to FIG. 2, each optical beam 202 is amplified in optical amplifiers 203 and then combined by optical multiplexer (MUX) 204, which may be, for example, a wavelength division multiplexer. The output of MUX 204 is a combined optical beam 205 including optical beams 202-1 through 202-n. In one example, the combined optical beam 205 may be sampled by a sampler 206, which may be for example, a tapped isolator (Iso-Tap) or optical coupler. In one example, the sample 207 of the combined optical beam 205 may be applied to an interferometer 217, which may be, for example, a Mach Zehnder Interferometer (MZI). The output of the interferometer 217 will be n beat frequency signals 218 corresponding to the n optical beams 202-1 through 202-n. Each beat frequency signal in the n beat frequency signals 218 will be a constant frequency if the chirp modulation of the corresponding optical beam 202-1 through 202-n is linear. Any deviation from chirp linearity will result in a frequency deviation in a corresponding beat frequency signal.

In one example, the output 218 of the interferometer 217 may applied to an optical demultiplexer (DEMUX) 219, which may be a wavelength division demultiplexer, for example. DEMUX 219 may be configured to separate the n beat frequency signals 218. The n beat frequency signals 218 may be applied to a bank of photodetectors (PDs) 220-1 through 220-n, (collectively photodetectors 220), to detect each of the beat frequency signals.

The outputs of photodetectors 220, collectively 221, may be fed back to optical sources 201 in a phase-locked loop (not shown) to correct any nonlinearities in the chirp modulation of the optical beams 202.

After passing through sampler 206, the combined optical beam may be sampled a second time by sampler 208, to generate a local oscillator (LO) signal 209 for further processing described in detail below. After passing through sampler 208, the combined optical beam is routed by optical circulator 210 to scanner 211. Scanner 211 is configured to scan a target environment in azimuth and elevator with the combined optical beam 205 and to de-scan a target return signal 212 from a target 213 in the target environment.

The target return signal 212 from the scanner 211 is then routed by optical circulator 210 to optical mixer 214, where it is mixed with LO signal 209 from sampler 208, which includes samples of optical beams 202-1 through 202-n in the combined optical signal 205.

The target return signal 212 will be a delayed version of the combined optical beam 205 (and of the LO signal 209) due to the round-trip time to and from the target 213. Due to the chirp modulation, this delay will result in a range-related frequency shift ($\Delta f_R$) between each outgoing component optical beam 202-1 through 202-n of combined optical beam 205, and its corresponding return signal 212-1 through 212-n in the target return signal 212. The target return signal 212 (and its component return signals 212-1 through 212-n) may also include a Doppler frequency shift MD due to the velocity of the target.

Figure 4:
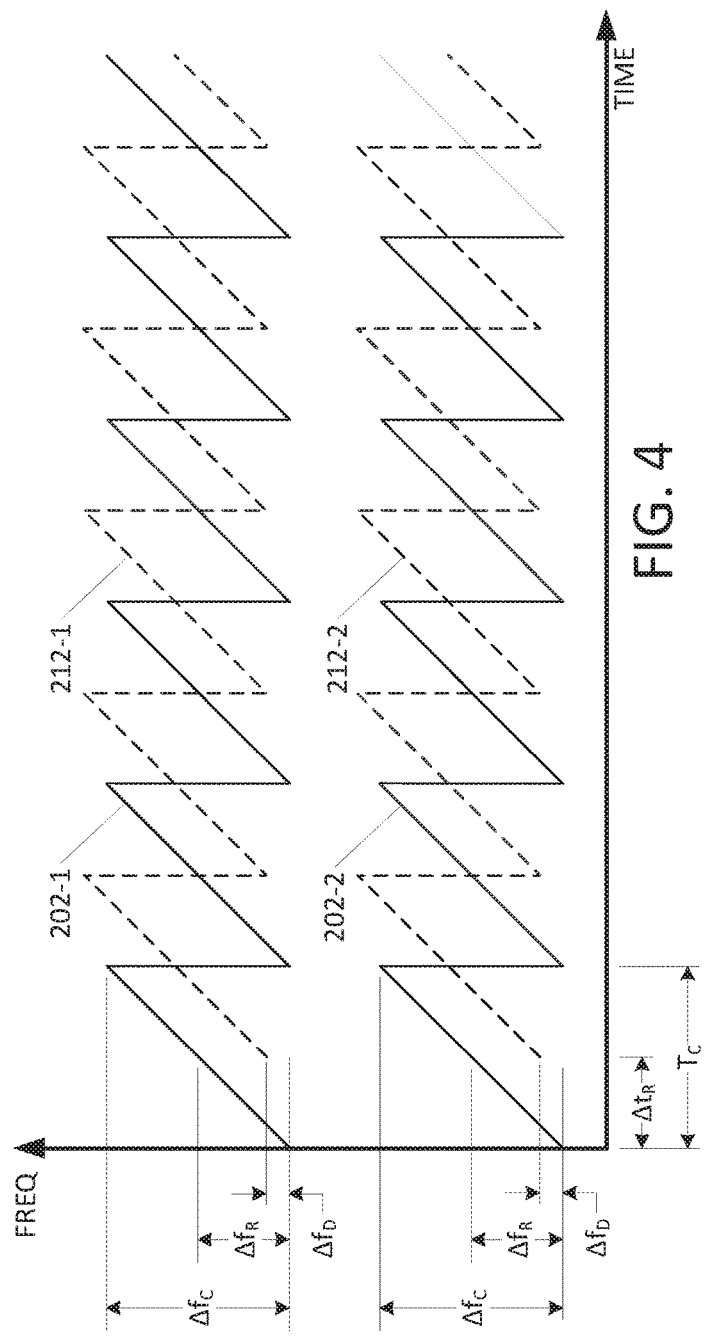
FIG. 4 is a time-frequency diagram illustrating another example of LIDAR waveforms according to the present disclosure.

These frequency shift effects are illustrated in FIG. 4, using optical beams 202-1 and 202-1, and their corresponding target return signals 212-1 and 212-2, as an example. In FIG. 4, the target return signals are delayed by AtR. If the chirp bandwidth is Δfc and the chirp period is Tc, then the range-related frequency shift $\Delta f_R$ can be expressed as equation (1):

$$\Delta f_R = \Delta t_R (\Delta f_C / T_C) \quad (1)$$

If there is a Doppler shift on the return signals 212, the net frequency shift between the outgoing optical beams 202 and the target return signals 212 will be $\Delta f_R - \Delta f_D$. If the Doppler shift is positive (approaching target), the net frequency shift will be $\Delta f_R - \Delta f_D$ (as illustrated in the example of FIG. 4). If the Doppler shift is negative (receding target), the net frequency shift will be $\Delta f_R + \Delta f_D$.

Figure 5:
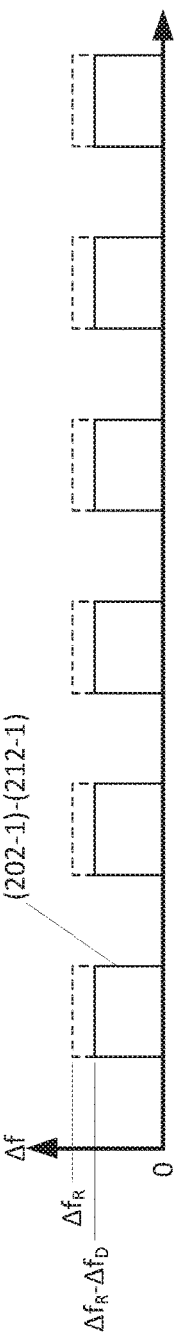
FIG. 5 is a time-frequency diagram illustrating another example of LIDAR waveforms according to the present disclosure.
Figure 6:
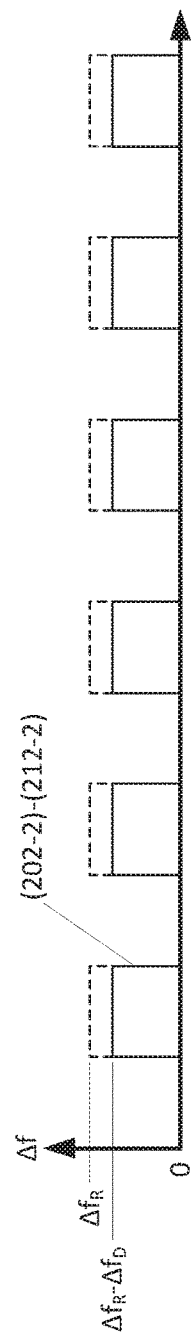
FIG. 6 is a time-frequency diagram illustrating another example of LIDAR waveforms according to the present disclosure.

FIG. 5 is a time-frequency diagram 500 illustrating the frequency difference between optical beam 202-1 and target return signal 212-1, which is a constant value (assuming target range and velocity do not change during the measurement interval). Similarly, FIG. 6 is a time-frequency diagram 600 illustrating the frequency difference between optical beam 202-2 and target return signal 212-2, which is also a constant value (under the same constraints). It can be seen that even though the absolute frequencies of the signal pairs are different, their difference frequencies are the same.

Returning to FIG. 2, as a result of first-order mixing between each sampled optical beam 202-1 through 202-n in LO signal 209, and its corresponding target return signals 212-1 through 212-n in the target return signal 212, there will be n downconverted fixed frequency target return signals 215 at the output of optical mixer 214, all at the same intermediate frequency $f_1 = \Delta f_R - \Delta f_D$. As noted above, these n signals will all be at the same phase-locked frequency, and may be applied to photodetector (PD) 216, where they may be coherently combined to generate a combined downconverted return signal with potentially n times the amplitude of each individual signal.

However, to realize the full advantage of the multiple optical beams in the system 200 described above, the signals in the transmit and return paths should combine constructively in the photodetector 216. The total current in the photodetector 216 due to the n fixed frequency downconverted target return signals 215 can be expressed as:

$$i_{PD}(t) = \sum_{i=1}^{n} G \mathcal{R} \sqrt{R \eta \Gamma_{Tx}} A_{LO} A_{TR} \cos\left(\omega_i \tau + \gamma_i \tau t - \gamma_i \frac{\tau^2}{2} + \phi_i(t) - \phi_i(t-\tau)\right), \quad (2)$$

which can be simplified to:

$$i_{PD-AC}(t) = \\ G \mathcal{R} \sqrt{R \eta \Gamma_{Tx}} A_{LO} A_{TR} \sum_{i=1}^{n} \cos\left(\omega_i \tau + \gamma_i \tau t - \gamma_i \frac{\tau^2}{2} + \phi_i(t) - \phi_i(t-\tau)\right) \quad (3)$$

where G is the gain of each optical amplifier 203, $\Gamma_{Tx}$ is the forward transmission coefficient (including component losses and free space path loss), η is the transmission coefficient of the return path, R is the reflectivity of the target 213, $\mathcal{R}$ is the responsivity of the photodetector 216, $A_{LO}^{\omega i}$ and $A_{TR}^{\omega i}$ are the respective amplitudes of the LO signal 209 and the target return signal 212 associated with optical beam frequency $\omega_i$ (where $\omega_i = 2\pi f_i$), $\phi_i(t) - \phi_i(t-\tau)$ is the phase noise of the i-th optical beam 202, $\gamma_i \equiv d\omega_i/dt$ is the chirp rate (equal to $2\pi \Delta f / Tc$), and τ is the time of flight (τ=2d/c, where d is the distance to the target and c is the speed of light).

To achieve improved system performance (i.e., range and sensitivity), the summation must be greater than 1. Ideally, the $$\sum_{i=1}^{n} \cos\left(\omega_i \tau + \gamma_i \tau t - \gamma_i \frac{\tau^2}{2} + \phi_i(t) - \phi_i(t-\tau)\right)$$

summation can be as large as the number of optical beams (n) when the cosines constructively superpose. Assuming the linewidth of each optical beam is sufficiently narrow for this application (i.e., $\phi_i(t) \cong 0$, two conditions must be satisfied to maximize the photodetector current:

1. $\gamma_i \tau \cong \gamma_j \tau$ for all optical beams, meaning that the chirp rate for all lasers should be equal, and
2. $\omega_i \tau - \omega_j \tau \cong 2\pi n$ for all lasers and all target distances (times of flight.).

As described above, the first condition can be satisfied using an interferometer (such as MZI 217) in a phase-locked loop. The second condition can be restated as:

$$(\omega_i - \omega_j) 2d/c \cong 2\pi m \rightarrow d_{cons} = m \times (c/2\Delta f_{ij}),$$

where m is any integer and $d_{cons}$ are the multiple ranges where the two optical beams combine constructively. For example, for two optical beams separated by 500 GHz (gigahertz), constructive interference will occur at multiples of 0.3 mm (millimeters). That is, the combined beams will alternate between constructive interference and destructive interference every 1.5 mm. In most applications, such as automotive applications, these distances are much smaller than the range resolution associated with the chirp rate and detection interval of the LIDAR system; so that the integrated energy of the downconverted target return signals will be greater than 1-times and less than 2-times the energy available from a single beam system. It can be seen that non-adjacent signals, separated by multiples of 500 GHz in this example, will have a more fine-grained periodicity in constructive interference. For example, a 1000 GHz separation yields a 1.5 mm periodicity; a 1500 GHz separation yields a 1.0 mm periodicity, and so on. When all of the n signals are integrated, the integrated signal energy will be greater than 1-times and less than n-times the energy available from a single beam system. As n increases, and the average spatial periodicity of the combined signals decreases, the integrated energy of the downconverted target return signals will approach n times the energy of a single beam system.

Figure 7:
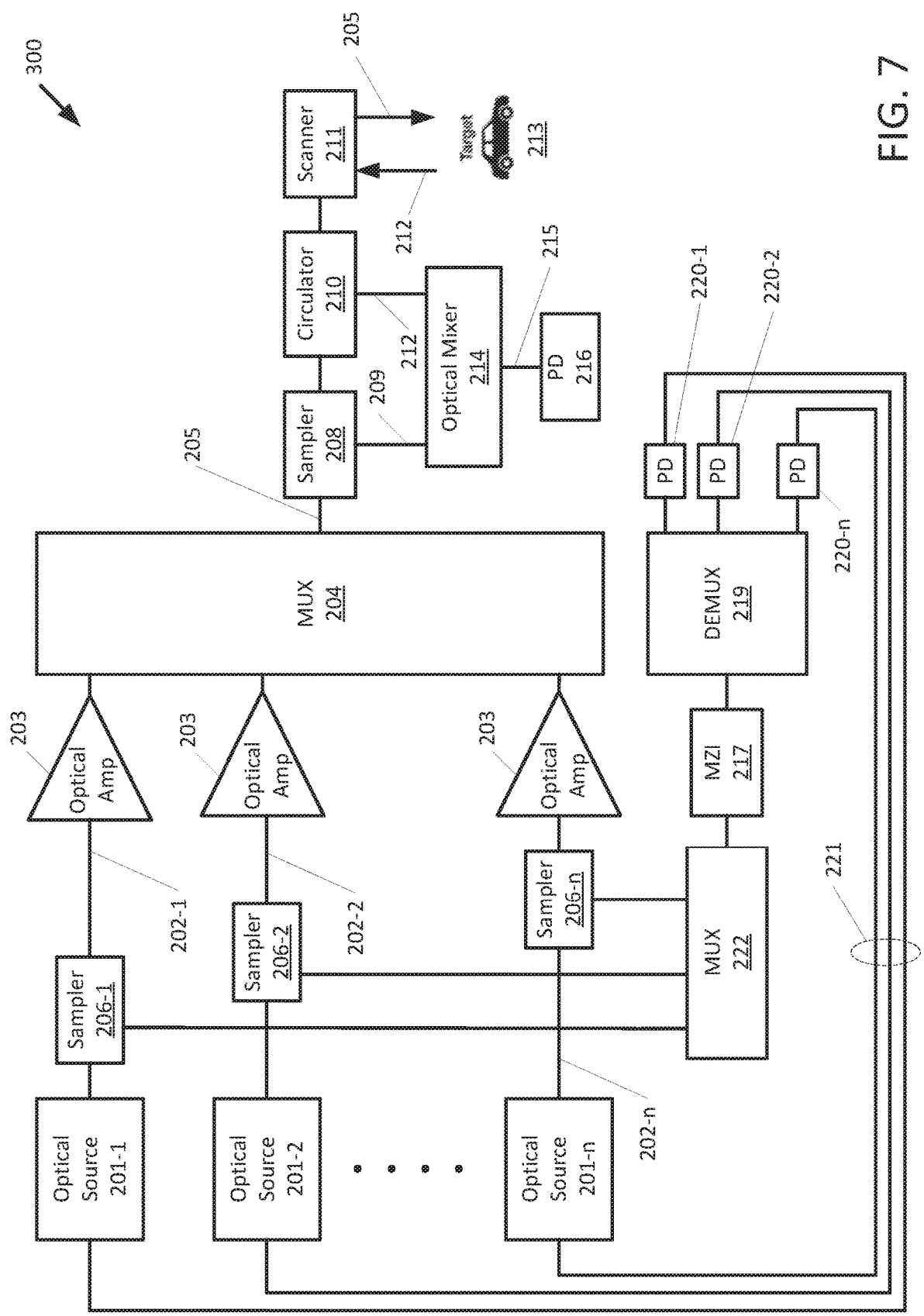
FIG. 7 is a block diagram illustrating an example LIDAR system in a second configuration according to the present disclosure.

FIG. 7 is a block diagram illustrating another example LIDAR system 300. System 300 is similar to system 200 in many respects, and some details will not be repeated here. As for system 200, some of the optical components illustrated in FIG. 3 may be integrated components within a photonics integrated circuit and may be included in the optical circuits 101 illustrated in FIG. 1, for example. Other optical components illustrated in FIG. 7 may be free space optical components and may be included in the free space optics 115 illustrated in FIG. 1.

System 300 includes a plurality of optical sources 201-1 through 201-n that each emit a corresponding coherent optical beam (e.g., laser beam) 202-1 through 202-n. The optical beams (202 collectively) are frequency modulated with synchronized linear "chirp" waveforms, which may be sawtooth waveforms or triangle waveforms, for example. FIG. 3, described above with respect to system 200, illustrates an example of sawtooth modulation. As illustrated in FIG. 3, the optical beams 202 are tuned to have a fixed frequency separation or offset $\Delta f_0$ between frequency adjacent beams so that the optical beams 202 form a "comb" of equally spaced signals in the frequency domain. FIG. 3 also illustrates that, because the chirps are synchronized, having the same timing, chirp bandwidth ($\Delta fc$), and chirp period (Tc), the frequency offset between any two adjacent beams is maintained throughout each chirp. This is illustrated in the time-frequency diagram 300 of FIG. 3 for the first four optical beams (202-1, 202-2, 202-3, and 202-4), where the separation $\Delta f_0$ between frequencies $f_1$, $f_2$, $f_3$ and $f_4$ is the same as the separation between frequencies $f_5$, $f_6$, $f_7$ and $f_8$.

Returning to FIG. 3, each optical beam 202-1 through 202-n is sampled by a corresponding sampler 206-1 through 206-n (collectively samplers 206), which may be the same as sampler 206 in system 200. The samples of the optical beams 207-1 through 207-n (collectively samples 207) are combined in optical multiplexer (MUX) 222 to generate a combined sample signal 222. An interferometer, such as MZI 217 receives the combined sample signal 222. The output of the interferometer 217 will be n beat frequency signals 218 corresponding to the n optical beams 202-1 through 202-n. Each beat frequency signal in the n beat frequency signals 218 will be a constant frequency if the chirp modulation of the corresponding optical beam 202-1 through 202-n is linear. Any deviation from chirp linearity will result in a frequency deviation in a corresponding beat frequency signal.

The output 218 of interferometer 217 may be applied to optical demultiplexer (DEMUX) 219. DEMUX 219 is configured to separate the n beat frequency signals 218. The n beat frequency signals 218 are then applied to a bank of photodetectors 220-1 through 220-n (collectively photodetectors 220), to detect each of the beat frequency signals.

The outputs of photodetectors 220, collectively 221, may be fed back to optical sources 201 in a phase-locked loop (not shown), to correct any nonlinearities in the chirp modulation of the optical beams 202.

After being sampled by samplers 206, each optical beam 202 is amplified in an optical amplifier 203 and then combined by optical multiplexer (MUX) 204. The output of MUX 204 is a combined optical beam 205 including optical beams 202-1 through 202-n.

The combined optical beam may then be sampled by sampler 208 to generate a local oscillator (LO) signal 209 for further processing described in detail below. After passing through sampler 208, the combined optical beam 205 is routed by optical circulator 210 to scanner 211. Scanner 211 is configured to scan a target environment in azimuth and elevator with the combined optical beam 205 and to de-scan a target return signal 212 from a target 213 in the target environment.

The target return signal 212 from the scanner 211 is then routed by optical circulator 210 to optical mixer 214, where it is mixed with LO signal 209 from sampler 208, which includes samples of optical beams 202-1 through 202-n in the combined optical signal 205.

As described above with respect to system 200, the target return signal 212 will be a delayed version of the combined optical beam 205 (and of the LO signal 209) due to the round-trip time to and from the target 213. Due to the chirp modulation, this delay will result in a range-related frequency shift ($\Delta f_R$) between each outgoing component optical beam 202-1 through 202-n of combined optical beam 205, and its corresponding return signal 212-1 through 212-n in the target return signal 212. The target return signal 212 (and its component return signals 212-1 through 212-n) may also include a Doppler frequency shift MD due to the velocity of the target. These frequency shift effects are discussed above with respect to system 200 in conjunction with FIGS. 4, 5 and 6, and are not repeated here.

Returning to FIG. 7, as a result of first-order mixing between each sampled optical beam 202-1 through 202-n and its corresponding target return signals 212-1 through 212-n in the target return signal 212, there will be n downconverted target return signals 215 at the output of optical mixer 214, all at the same intermediate frequency $f_1 = \Delta f_R - \Delta f_D$. As noted above, these n signals will all be at the same phase-locked frequency, and may be applied to photodetector 216, where they may be coherently combined to generate a combined downconverted target return signal with potentially n times the amplitude of each individual signal. As discussed above with respect to system 200, the mixing process may produce range-dependent interference patterns between the transmitted and target return signals, with periodicities that are smaller than the range resolution capability of the LIDAR system 300, based on chirp rate and target detection time. As a result, periodic zones of constructive and destructive interference are integrated to yield an average detected signal energy that is greater than 1-times and less than n-times the energy available from a single beam system. As described above, as n increases, the integrated energy of the downconverted target return signals approaches n times the energy available from a single beam system.

Figure 8:
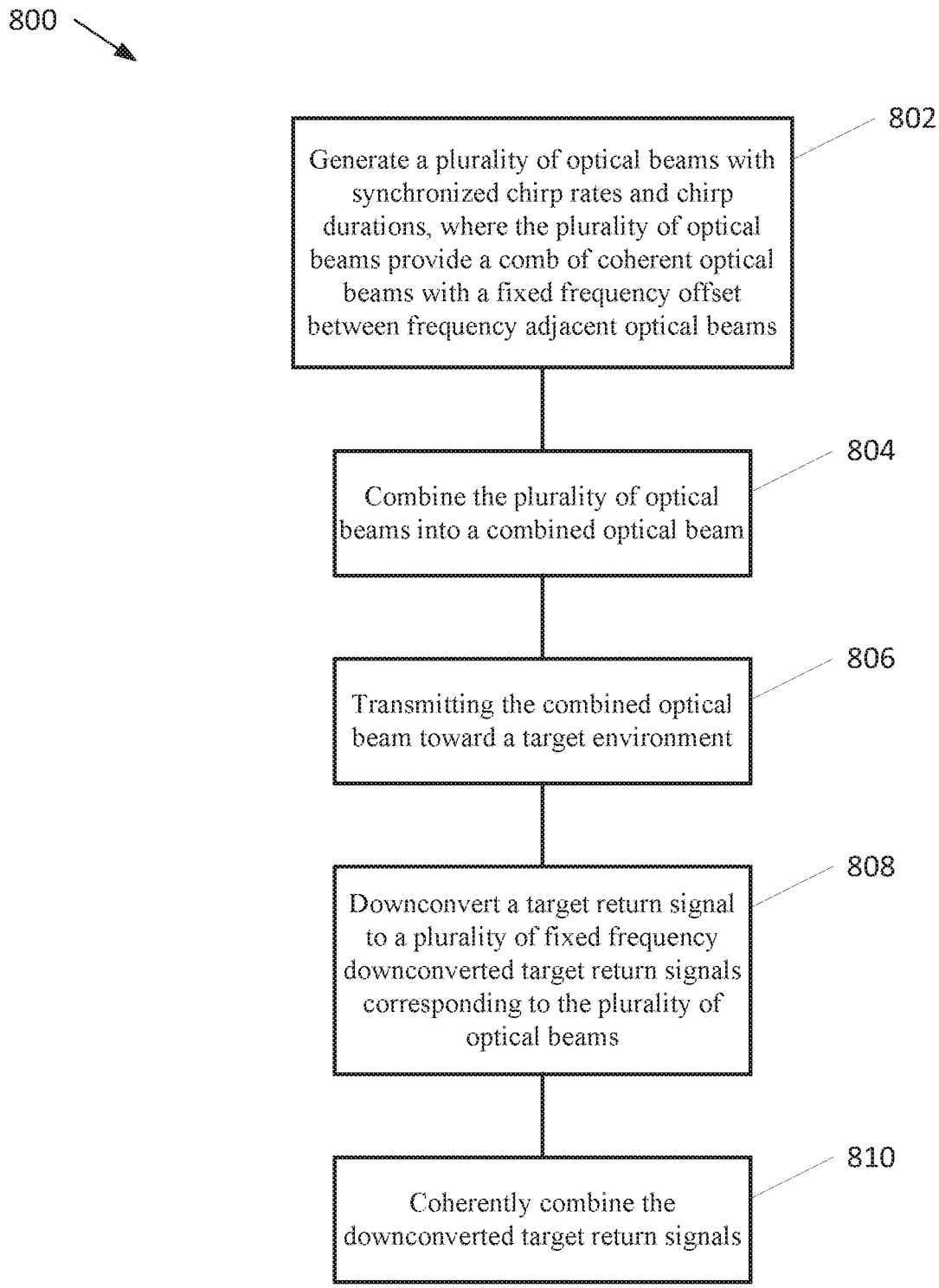
FIG. 8 is a flow diagram illustrating an example method in a LIDAR system according to the present disclosure.

FIG. 8 is a flow diagram 800 illustrating one example of a method for increasing the effective power and sensitivity of a LIDAR system, such as systems 200 and 300. Method 800 begins at block 802, where a plurality of optical beams (e.g., optical beams 202) are generated with synchronized chirp rates (e.g., $\Delta fc/Tc$) and chirp durations (e.g., Tc), where the plurality of optical beams provide a comb of coherent optical beams with a fixed frequency offset (e.g., $\Delta fo$).

In block 804, the plurality of optical beams is combined in an optical multiplexer (e.g., MUX 204) to form a combined optical beam (e.g., combined optical beam 205).

In block 806, the combined optical beam is transmitted toward a target environment. For example, combined optical beam 205 is transmitted through sampler 208, circulator 210, and scanner 211.

In block 808, a target return signal (e.g., target return signal 212) is downconverted into a plurality of fixed frequency downconverted target return signals (e.g., signals 215) corresponding to the plurality of optical beams.

And, in block 810, the downconverted target return signals are coherently combined in a photodetector (e.g., photodetector 216).

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
   a plurality of optical sources to emit a corresponding plurality of optical beams with synchronized chirp rates and chirp durations, wherein the plurality of optical beams are each tuned to have a fixed frequency separation between each other based at least in part on a same chirp period;
   first optical hardware components coupled with the optical sources to amplify and combine the optical beams into a combined optical beam, wherein the fixed frequency separation between the frequency adjacent optical beams is selected to produce periodic regions of constructive and destructive interference in the combined optical beam;
   second optical hardware components, coupled to the first optical hardware components, to transmit the combined optical beam toward a target environment and to receive a target return signal; and
   third optical hardware components, coupled to the second optical hardware components, to downconvert the target return signal to a plurality of fixed frequency downconverted target return signals corresponding to the plurality of optical beams, and to coherently combine the downconverted target return signals, wherein each of the downconverted target return signals comprises a target range component and a target velocity component; and
   fourth optical hardware components, coupled with the first optical hardware components, to form a phase-locked loop to correct nonlinearities detected in the plurality of optical beams.

2. The system of claim 1, wherein a separation between the periodic regions of constructive interference is less than a range resolution capability of the system.

3. The system of claim 1, wherein the fourth optical hardware components are further to sample the optical beams and to generate control signals to synchronize the optical sources.

4. The system of claim 1, wherein the first optical hardware components comprise:
   a plurality of optical amplifiers to amplify the plurality of optical beams; and
   an optical multiplexer to combine the plurality of optical beams into the combined optical beam.

5. The system of claim 1, wherein the second optical hardware components comprise:
   an optical sampler to sample a local oscillator signal from the combined optical beam; and
   an optical circulator to route the combined optical beam from the optical sampler to a scanner and to route the target return signal from the scanner to the third optical hardware components, wherein the scanner is configured to scan the target environment with the combined optical beam and to de-scan the target return signal.

6. The system of claim 5, wherein the third optical hardware components comprise:
   an optical mixer to mix the local oscillator signal with the target return signal to generate the plurality of downconverted target return signals; and
   a photodetector to coherently combine the plurality of downconverted target return signals.

7. The system of claim 1, wherein the fourth optical hardware components comprise:
   an optical sampler to sample the combined optical beam;
   an interferometer, coupled to the optical sampler to generate beat frequency signals from each of the optical beams;
   an optical demultiplexer to separate the beat frequency signals; and
   a bank of photodetectors to detect each of the beat frequency signals and to generate the control signals to synchronize the optical sources.

8. The system of claim 1, wherein the fourth optical hardware components comprise:
   a plurality of optical samplers, coupled between the plurality of optical sources and the plurality of optical amplifiers, to sample the plurality of optical beams;
   an optical multiplexer to combine the sampled optical beams;

an interferometer coupled to the optical multiplexer to generate beat frequency signals from each of the sampled optical beams;

an optical demultiplexer to separate the beat frequency signals; and a bank of photodetectors to detect each of the beat frequency signals and to generate the control signals to synchronize the optical sources.

9. A method for light detection and ranging (LIDAR), comprising:

generating, from a plurality of optical sources, a plurality of optical beams with synchronized chirp rates and chirp durations, wherein the plurality of optical beams comprise a comb of coherent optical beams with a fixed frequency offset between each other based at least in part on a same chirp period, wherein the fixed frequency offset between the frequency adjacent optical beams is selected to produce periodic regions of constructive and destructive interference in the combined optical beam;

combining the plurality of optical beams into a combined optical beam;

transmitting the combined optical beam toward a target environment; and downconverting a target return signal to a plurality of fixed frequency downconverted target return signals corresponding to the plurality of optical beams, wherein each of the downconverted target return signals comprises a target range component and a target velocity component; and coherently combining the downconverted target return signals.

10. The method of claim 9, wherein a separation between the periodic regions of constructive interference is less than a range resolution of the system.

11. The method of claim 9, wherein downconverting the target return signal to the plurality of downconverted target return signals comprises:

sampling a local oscillator (LO) signal from the combined optical beam; and mixing the LO signal with the target return signal to generate the plurality of downconverted target return signals.

12. The method of claim 9, wherein coherently combining the downconverted target return signals comprises detecting the downconverted target return signals in a photodetector.

13. The method of claim 9, further comprising generating control signals from the optical beams to synchronize the plurality of optical sources.

14. The method of claim 13, wherein generating the control signals comprises:

sampling the combined optical beam;

generating beat frequency signals from each of the plurality of optical beams in an interferometer;

separating the beat frequency signals in an optical demultiplexer; and detecting the beat frequency signals in a bank of photodetectors to generate the control signals.

15. The method of claim 13, wherein generating the control signals comprises:

sampling the plurality of optical beams;

combining the sampled optical beams;

generating beat frequency signals from each of the sampled optical beams in an interferometer;

separating the beat frequency signals in an optical demultiplexer (DEMUX); and detecting the beat frequency signals in a bank of photodetectors to generate the control signals.

16. The method of claim 13, further comprising providing the control signals to the plurality of optical sources to synchronize the plurality of optical sources.

17. The method of claim 9, further comprising amplifying the plurality of optical beams.

18. The method of claim 9, further comprising receiving the target return signal from the target environment.

* * * * *